United States Patent
Keller et al.

(10) Patent No.: US 8,411,641 B2
(45) Date of Patent: Apr. 2, 2013

(54) METHODS FOR CONTROLLING ACCESS DOMAIN SWITCHING, NETWORK NODES, USER TERMINAL AND COMPUTER PROGRAM PRODUCT THEREFOR

(75) Inventors: Ralf Keller, Würselen (DE); Andreas Witzel, Herzogenrath (DE); George Foti, Dollard des Ormeaux (CA); Rogier Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 602 days.

(21) Appl. No.: 12/518,037

(22) PCT Filed: Dec. 5, 2006

(86) PCT No.: PCT/EP2006/011688
§ 371 (c)(1),
(2), (4) Date: Jun. 5, 2009

(87) PCT Pub. No.: WO2008/067832
PCT Pub. Date: Jun. 12, 2008

(65) Prior Publication Data
US 2010/0322215 A1    Dec. 23, 2010

(51) Int. Cl.
*H04W 4/00*    (2009.01)
(52) U.S. Cl. ........................................................ 370/331
(58) Field of Classification Search .................. 370/331, 370/338; 455/436, 439, 442
See application file for complete search history.

(56) References Cited

U.S. PATENT DOCUMENTS

| | | | |
|---|---|---|---|
| 2004/0176024 A1* | 9/2004 | Hsu et al. | 455/3.04 |
| 2006/0104262 A1 | 5/2006 | Kant et al. | |
| 2006/0120355 A1* | 6/2006 | Zreiq et al. | 370/352 |

FOREIGN PATENT DOCUMENTS

| EP | 1 624 711 A1 | 2/2006 |
|---|---|---|
| WO | WO 2006/012909 A | 2/2006 |
| WO | WO 2006/056184 | 6/2006 |

OTHER PUBLICATIONS

3GPP. 3rd Generation Partnership Project: Technical Specification Group Services and System Aspects; Voice Call Continuity between CS and IMS Study (Release 7). 3GPP TR 23.806 v1.7.0. Nov. 2005.
3GPP. 3rd Generation Partnership Project: Technical Specification Group Services and System Aspects; Voice Call Continuity between CS and IMS; Stage 2 (Release 7). 3GPP TS 23.206 v0.3.0. Feb. 2006.
3GPP. 3rd Generation Partnership Project; Technical Specification Group Services and System Aspects: IP Multimedia Subsystem (IMS); Stage 2 (Release 7). 3GPP TS 23.228 v7.2.0. Dec. 2005.

* cited by examiner

*Primary Examiner* — Mark Rinehart
*Assistant Examiner* — Mang Yeung (57) ABSTRACT

A technique for controlling an access domain selection is described. The technique is applicable to user terminals that are capable of switching from a first network access domain to a second network access domain while services are provided to the user terminals. According to a network aspect of this technique, a network node receives a request message from a user terminal. In response to this request message, the network node sends a rule set including one or more access domain switching rules to the user terminal. These access domain switching rules may be dynamically selected by the network node to control the access domain switching behavior of the user terminal.

23 Claims, 7 Drawing Sheets

METHODS FOR CONTROLLING ACCESS DOMAIN SWITCHING, NETWORK NODES, USER TERMINAL AND COMPUTER PROGRAM PRODUCT THEREFOR

FIELD OF THE INVENTION

The invention generally relates to a technique for selecting an access domain for a user terminal. In particular, the invention relates to an access domain switching technique which is performed in accordance with a specific rule set.

BACKGROUND OF THE INVENTION

User terminals are used to retrieve information from a network server, to connect via is the network to another user terminal, and for many further purposes that require a network connection. The network capabilities of user terminals depend on the supported network access technologies. A mobile telephone, for example, typically supports a cellular access technology according to the GSM (Global System for Mobile communication) standard, a WCDMA (Wideband Code Division Multiple Access) standard or a similar cellular standard. For a personal computer, on the other hand, support of a WLAN (Wireless Local Area Network) access technology is widespread.

In recent years, the number of WLAN hot spots and the GSM/WCDMA coverage has steadily increased, and in many geographical places two or even more different access technologies are available at the same time. As a result of the increased availability of network accesses, modern user terminals often support two or even more different network access technologies. Support of more than one network access technology is generally advantageous because—provided that multiple network accesses are actually available at the current location of the user terminal—the user terminal may dynamically select a specific network access. While data communication, for example, is typically faster via a WLAN access, a GSM/WCDMA access is generally better suited for voice communication. There are, of course, many further considerations why to select a particular network access, including cost arguments and subscription agreements.

For user terminals that support more than one access technology, service continuity is an important aspect. The paradigm of service continuity implies that a transfer from a first network access to a second network access can be performed without interrupting a service currently provided to the user terminal.

A well known service continuity concept is Voice Call Continuity (VCC). VCC is a mobility scheme on a call control level that has been defined by the Third Generation Partnership Project (3GPP) in various technical specifications, including Technical Specification Group Services and System Aspects; Voice Call Continuity between CS and IMS Study (Release 7), 3GPP TR 23.806, Version 1.7.0 and Technical Specification Group Services and System Aspects; Voice Call Continuity between CS and IMS; Stage 2 (Release 7), 3GPP TS 23.206, Version 0.3.0.

With VCC, a voice call can be transferred for example between a GSM or WCDMA based circuit-switched (CS) access domain on the one hand and a WLAN or WCDMA-based packet-switched (PS) access domain on the other hand without disconnecting the call. In this regard, FIG. 1 illustrates an exemplary access domain transfer scenario for a voice call in accordance with the 3GPP VCC scheme, for a mobile user terminal 10 supporting GSM/WCDMA as well as WLAN access technologies.

Figure 1:
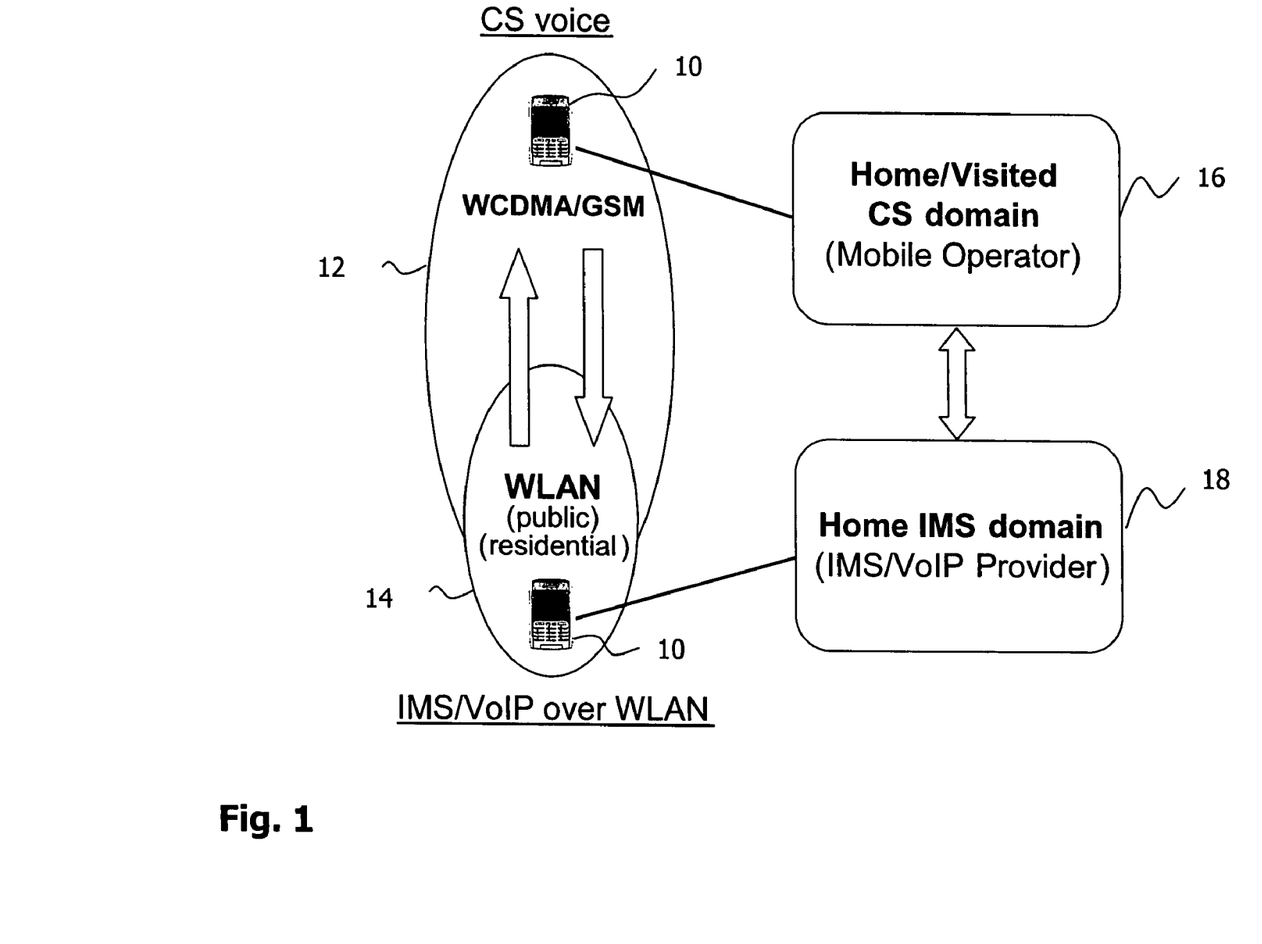
FIG. 1 is a schematic diagram illustrating an access domain scenario in which the invention can be practiced.

In the scenario of FIG. 1, one has to distinguish between access domain selection on the one hand and service domain selection on the other. It is assumed here that the GSM/WCDMA network access will be performed via a CS access domain 12, while the WLAN network access will be performed via a PS access domain 14. It is further assumed that the GSM/WCDMA voice services are provided in a CS service domain 16 by a mobile network operator, while the WLAN voice services are provided in a PS service domain 18 by a Voice-over-IP (VoIP) provider or a provider of an IP Multimedia Subsystem (IMS).

Now consider the situation in which the user terminal 10 is roaming during an ongoing voice call between a first area with GSM/WCDMA coverage and a second area with both GSM/WCDMA and WLAN coverage. When the user terminal 10 is roaming from the first area into the second area, and if the WLAN access is preferred, a VCC application residing on the user terminal 10 will initiate an access and service domain transfer from CS-GSM/WCDMA to IMS/VoIP over WLAN. Should the user terminal 10 at a later point in time roam back into a portion of the area without WLAN coverage, the opposite transfer will take place, i.e. from IMS/VoIP over WLAN to CSGSM/WCDMA. The scenario shown in FIG. 1 requires that the user terminal 10 supports a dual-radio mode to have a CS voice call and a VoIP/IMS Multimedia Telephony (MMTeI) session in parallel (at least during the access transfer phase).

According to the VCC specifications, the transfer from a first access domain to a second access domain is triggered by the user terminal. In addition to the preference-based transfer discussed above with reference to FIG. 1, the VCC specifications also describe an access domain transfer that is performed depending on radio conditions. This means that if the user terminal determines that coverage of one access domain starts to fade away or appear, the VCC application running on the user terminal may decide about a transfer to another access domain with better radio conditions.

While a transfer of the access domain triggered by user preferences and radio conditions is an important feature, it would be desirable to allow the network side to control or at least influence the access domain switching in certain cases. Accordingly, there is a need for an access domain switching technique that involves the network side.

SUMMARY OF THE INVENTION

According to a first aspect of the invention, a method of operating a network node for controlling an access domain switching behaviour of a user terminal capable of switching from a first network access domain to a second network access domain while a service is being provided to the user terminal is proposed. The method comprises the steps of receiving a request message from the user terminal and sending, in response to the request message, a rule set including one or more access domain switching rules to the user terminal.

In one example, the first network access domain is a CS domain, and the second access domain is a PS domain (or vice versa). In another example, the first access domain is a CS (or PS) domain operated according to a first communication standard, and the second network access domain is a CS (or PS) domain operated according to a second communication standard.

The rule set sent to the user terminal may be applicable to service continuity scenarios and may specify the access domain switching behaviour of the user terminal depending on one or more parameters. These one or more parameters may include at least one of a time of the day, a network condition, a location of the user terminal, an identity of the user terminal and an access domain switching instruction. An exemplary access domain switching rule allows, disallows or triggers an access domain transfer from the first network access domain to the second network access domain depending on the current location of the user terminal.

According to one scenario, the request message received from the user terminal is a dedicated message explicitly requesting the rule set. According to another scenario, the request message is a registration message that aims at registering the user terminal with the network. The registration message may, for example, register the user terminal in a service domain of the network.

In one implementation, the network node receives access information from the user terminal. The access information may be received together with the initial request message or, in the alternative, by any other message preceding or following the request message. The access information received from the user terminal may at least relate to a first set of network access technologies technically supported by the user terminal and/or to a second set of network accesses currently available to the user terminal. The access information received from the user terminal may be utilized by the network node to dynamically determine a specific rule set depending on the received access information.

In addition, or as an alternative, to determining the rule set depending on the received access information, the rule set may be dynamically determined by the network node based on one or more other parameters. These other parameters may include one or more of a time of the day, a network condition (such as a network load), a geographical location of the user terminal and an identity of the user terminal.

The network access domain switching features presented herein may be provided on a subscription basis. Accordingly, the method of operating the network node may further comprise monitoring if a subscription message is received from the user terminal in relation to a network application managing the access domain switching rules, and sending the rule set in response to receipt of the subscription message. The monitoring of the subscription message is preferably started in a close temporal relationship with receipt of the request message (e.g. when receipt of the request message is acknowledged to the user terminal). At the same time the network node may start a timer and send the rule set only if the subscription message is received before the timer expires.

According to a second aspect of the present invention, a method of operating a network node for controlling an access domain switching behaviour of a user terminal capable of switching from a first network access domain to a second network access domain while a service is being provided to the user terminal is proposed, wherein the method comprises the steps of maintaining a rule set including one or more access domain switching rules for controlling the access domain switching behaviour of the user terminal, generating an access domain switching instruction for the user terminal based on the one or more access domain switching rules, and sending the access domain switching instruction to the user terminal.

According to another aspect of the invention, a method of controlling a user terminal capable of switching from a first network access domain to a second network access domain while a service is being provided to the user terminal is proposed. The method comprises the steps of sending a request message to the network and receiving, in response to the request message, a rule that including one or more access domain switching rules controlling an access domain switching behaviour of the user terminal. As stated above, the request message may be a dedicated message sent by the user terminal in order to request the rule set or, in the alternative, a conventional registration message that aims at registering the user terminal in the network.

Together with, or separately from, the request message, the user terminal may send access information to the network. The access information preferably relates to at least one of a first set of network access technologies technically supported by the user terminal and a second set of network access currently available to the user terminal.

According to a first control variant, the user terminal evaluates at least one access domain switching parameter defined in the one or more access domain switching rules and autonomously performs an access domain switching decision in accordance with the evaluation of the at least one access domain switching parameter. The at least one access domain switching parameter may be selected from the group including a time of the day, a network condition, a location of the user terminal and an identity of the user terminal.

According to a second control variant, the user terminal receives an explicit access domain switching instruction from the network as defined in the one or more access domain switching rules and performs access domain switching in accordance with the access domain switching instruction received from the network. The access domain switching rules received earlier from the network may thus control how the user terminal reacts to a specific access domain switching instruction.

The access domain switching performed by the user terminal may aim at initiating an access transfer from the first network access domain to the second network access domain while the service is being provided to the user terminal. This situation corresponds to the service continuity case. Alternatively, the access domain switching performed by the user terminal may aim at selecting either one of the first network access domain and the second network access domain for originating a service request.

In a subscription context, the user terminal may send a subscription message that aims at subscribing to a network application in charge of managing the access domain switching rules. The user terminal may subsequently receive the rule set in response to this subscription message.

The invention can be practiced in the form of hardware, in the form of software, or in the form of a combined hardware/software approach. As for a software aspect, a computer program product is provided. The computer program product comprises program code portions for performing the steps of the present invention when the computer program product is run on one or more computing devices. The computer program product may be stored on a computer-readable recording medium.

As for a hardware aspect, a network node for controlling an access domain switching behaviour of a user terminal capable of switching from a first network access domain to a second network access domain while a service is being provided to the user terminal is proposed. The network node comprises a first interface adapted to receive a request message from the user terminal, and a second interface adapted to send, in response to the request message, a rule set including one or more access domain switching rules to the user terminal. The network node may further comprise a processor adapted to determine the rule set. The processor may determine the rule set dependent on at least one of a first set of network access technologies technically supported by the user terminal, a second set of network accesses currently available to the user terminal, a time of the day, a network condition, a location of the user terminal and an identity of the user terminal. Determining the rule set may include selecting a particular subset out of a predefined set of access domain switching rules.

According to another hardware aspect, a network node for controlling an access domain switching behaviour of a user terminal capable of switching from a first network access domain to a second network access domain while a service is being provided to the user terminal is proposed, wherein the network node comprises a database with a rule set including one or more access domain switching rules for controlling the access domain switching behaviour of the user terminal, a generator adapted to generate an access domain switching instruction for the user terminal based on the one or more access domain switching rules, and an interface adapted to send the access domain switching instruction to the user terminal.

According to a still further hardware aspect, a user terminal capable of switching from a first network access domain to a second network access domain while a service is being provided to the user terminal is proposed, wherein the user terminal comprises a first interface adapted to send a request message to the network, and a second interface adapted to receive, in response to the request message, a rule set including one or more access domain switching rules controlling an access domain switching behaviour of the user terminal.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following description, for purposes of explanation and not limitation, specific details are set forth, such as particular sequences of steps, interfaces and configurations, in order to provide a thorough understanding of the present invention. It will be apparent to one skilled in the art that a present invention may be practiced in other embodiments that depart from these specific details. For example, while the invention will primarily be described in context with WLAN/WCDMA communication standards, it will be apparent to the skilled artisan that the invention can also be practiced in connection with other communication standards such as Wi-MAX.

Moreover, those skilled in the art will appreciate that the functions explained herein below may be implemented using software functioning in conjunction with a programmed microprocessor or general purpose computer. It will also be appreciated that while the current invention is primarily described in the form of methods and apparatuses, the invention may also be embodied in a computer program product as well as in a system comprising a computer processor and a memory coupled to the processor, wherein the memory is encoded with one or more programs that may perform the functions disclosed herein.

The embodiments described below can be practiced in the access domain scenario shown in FIG. 1. As has been discussed above, domain switching, including domain selection, is a functionality typically required for user terminals 10 that can exist in two or more domains simultaneously, usually with the same Mobile Station Integrated Services Digital Network (MSISDN) number.

Conventional domain selection procedures can generally be divided into service domain selection (SDS) procedures on the one hand and access domain selection (ADS) procedures on the other hand.

SDS procedures are generally used to select the service engine that is to be applied for a particular voice or data call. SDS procedures are applicable to both originating and terminating calls. In other words, SDS procedures can be used for originating calls from a user to choose the particular service domain in which an originating service is to be provided. SDS procedures can, however, also be used in terminating scenarios for incoming calls to a user to select a particular domain that is to provide terminating services.

ADS procedures are employed for terminating calls to determine whether a particular call should be terminated on a PS access or a CS access. In some cases, ADS procedures are implemented in context with service continuity scenarios. ADS procedures are often tied to specific subscription types (e.g. are selectively available for VCC subscribers only). In typical ADS scenarios, ADS is performed only after anchoring the call in a particular service domain. This anchoring is usually performed in an SDS context and implies that ADS will in most cases be performed only after SDS has been performed.

The differentiation between SDS and ADS leads to three distinct levels of call delivery control. A first control level includes the SDS procedures to select a service domain (or, more specifically, a service engine) for treating an originating or terminating call setup request. A second control level includes the ADS procedures for call termination. As has been mentioned above, ADS procedures can be used in combination with service continuity solutions such as VCC or any non-voice services after the call has been anchored in a service domain. A third control level is provided for the normal selection between various contacts possibly available for an individual subscriber. This third level selection is based on preferences and capabilities of the terminating side of the call. In an exemplary IMS scenario, the third level selection may be performed by a Serving Call Session Control Function (S-CSCF) node.

The following embodiments mainly describe call delivery control based on access domain switching rules as well as its relationship to the three control levels outlined above.

Figure 2:
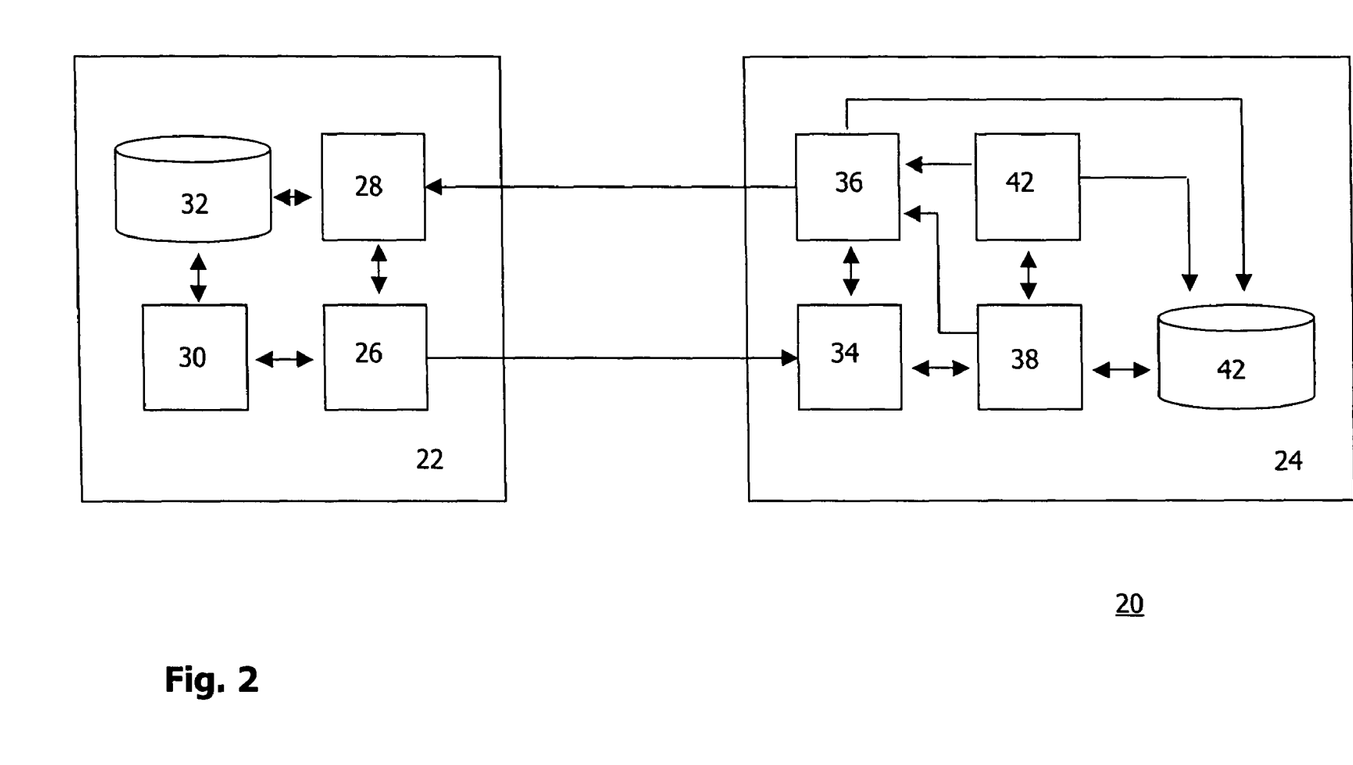
FIG. 2 is a schematic block diagram illustrating a communication network including apparatus embodiments of the present invention.

FIG. 2 shows a communications network 20 comprising a user terminal 22 and a network node 24. The user terminal 22 and the network node 24 are configured to communicate with each other via one or more network connections (not shown).

The user terminal 22 supports two or more network access technologies. The network access technologies supported by the user terminal 22 permit a switching from a first network access domain to a second network access domain while a service is being provided to the user terminal 22. The user terminal 22 can be any mobile component such as a mobile telephone, a laptop computer or a Personal Digital Assistant (PDA), or it may be a stationary component such as a personal computer. The two or more network access technologies supported by the user terminal may include wireless access schemes such as GSM, WCDMA or WLAN and/or wireline access schemes.

As shown in FIG. 2, the user terminal 22 comprises a first interface 26 adapted to send a request message to the network node 24, as well as a second interface 28 adapted to receive, in response to the request message, a rule set including in one or more access domain switching rules for controlling an access control switching behaviour of the user terminal 22. Although the two interfaces 26, 28 are shown in FIG. 2 as separate components, they may also be integrated into a single component if desired.

The user terminal 22 further comprises a processor 30 adapted to determine access information in relation to the user terminal 22. The access information includes a first set of network access technologies technically supported by the user terminal 22 and/or a second set of network accesses currently available to the user terminal 22. The processor 30 communicates with the first interface 26 for sending the access information to the network node 24 as required. A database 32 of the user terminal 22 is used for storing the rule set received via the second interface 28 from the network node 24. The rule set stored in the database 32 may be retrieved by the processor 30 for the purpose of performing an access domain switching decision.

The network node 24 shown in FIG. 2 provides a mechanism for controlling the access domain switching behaviour of the user terminal 22. To this end, the network node 24 comprises a first interface 34 adapted to receive a request message from the user terminal 22, and a second interface 36 adapted to send, in response to the request message, a rule set including one or more access domain switching rules to the user terminal 22. It should be noted that although the interface 34, 36 are shown as separate components in FIG. 2, they may be integrated into a single component if desired.

The network node 24 also comprises a processor 38 adapted to determine the rule set that is to be sent via the second interface 36 to the user terminal 22. The processor 38 may determine the rule set based on at least one of a first set of network access technologies technically supported by the user terminal 22, a second set of network accesses currently available to the user terminal 22, a time of the day, a network condition (such as the current interference situation or the load of individual network areas or network components), a location of the user terminal (such as a cell ID), and an identity of the user terminal (such as the MSISDN).

The processor 38 may determine the rule set either from the scratch or select a predefined rule set from a network database 42. In the database 42, at least one rule set including one or more access domain switching rules for controlling the access domain switching behaviour of the user terminal 22 is stored.

While in a first mode of operation the processor 38 is in charge of determining the rule set that is to be transferred to the user terminal 22, it determines in a second mode of operation whether or not a network access domain switching is required for the user terminal. This determination may be performed fully autonomously or based on information that has previously been received from the user terminal 22, such as the supported network access technologies and/or the available network accesses.

The network node 24 further comprises a generator 42 coupled to the processor 38. The generator 42 is adapted to generate an access domain switching instruction for the user terminal 22 based on the one or more access domain switching rules. The generator 42 communicates with the second interface 36 to send the generated access domain switching instruction to the user terminal 22.

Figure 3:
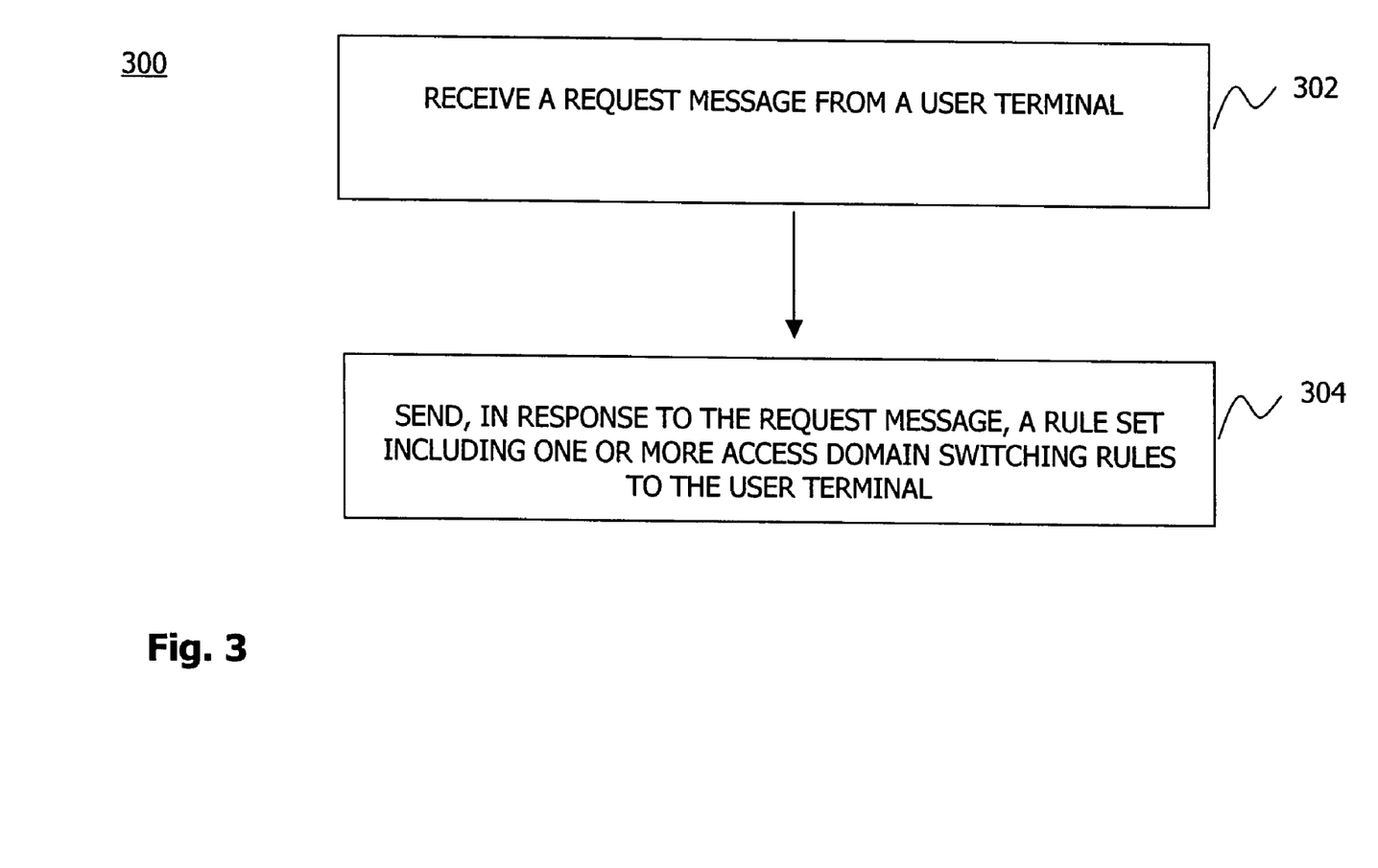
FIG. 3 is a flow chart illustrating a first method embodiment of the present invention.

FIG. 3 shows a flow chart 300 of a first method embodiment of the present invention. The method embodiment illustrated in FIG. 3 may be practiced by the network node 24 with its components as shown in FIG. 2 or by a network node having a different construction.

The method starts, in step 302, with receipt of a request message from the user terminal. In response to the request message, a rule set including one or more access domain switching rules is sent to the user terminal in a next step 304. An optional step not shown in FIG. 3 may include determining an appropriate rule set based on information included in the request message received in step 302.

Figure 4:
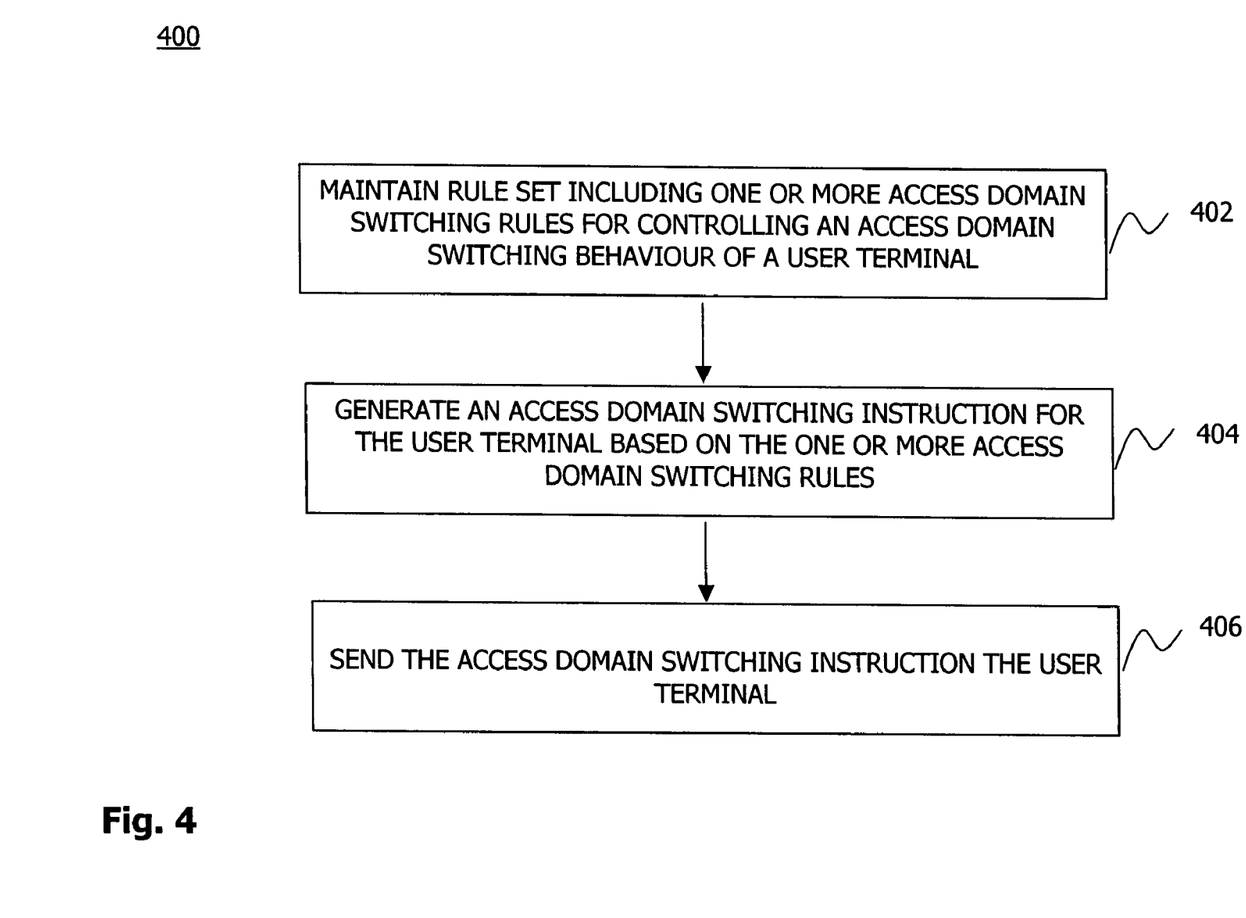
FIG. 4 is a flow chart illustrating a second method embodiment of the present invention.

FIG. 4 shows a flow chart 400 of another method embodiment that may be practiced by the network node 24 with its components as shown in FIG. 2 or by a network node having a different configuration.

The methods starts, in step 402, with maintaining a rule set including one or more access domain switching rules for controlling the access domain switching behaviour of the user terminal. The rule set may be maintained in a network database in the form of a list or table.

In a next step 404, an access domain switching instruction is generated for the user terminal dependent on the one or more access domain switching rules and, optionally, one or more decision parameters. The decision parameters may include at least one of the network access technologies technically supported by the user terminal, the network accesses currently available to the user terminal, the time of the day, a network condition, a location of the user terminal and an identity of the user terminal. The access domain switching rules may specify access domain preferences dependent on the decision parameters.

Once the access domain switching instruction has been generated in step 404, it is sent, in step 406, to the user terminal.

Figure 5:
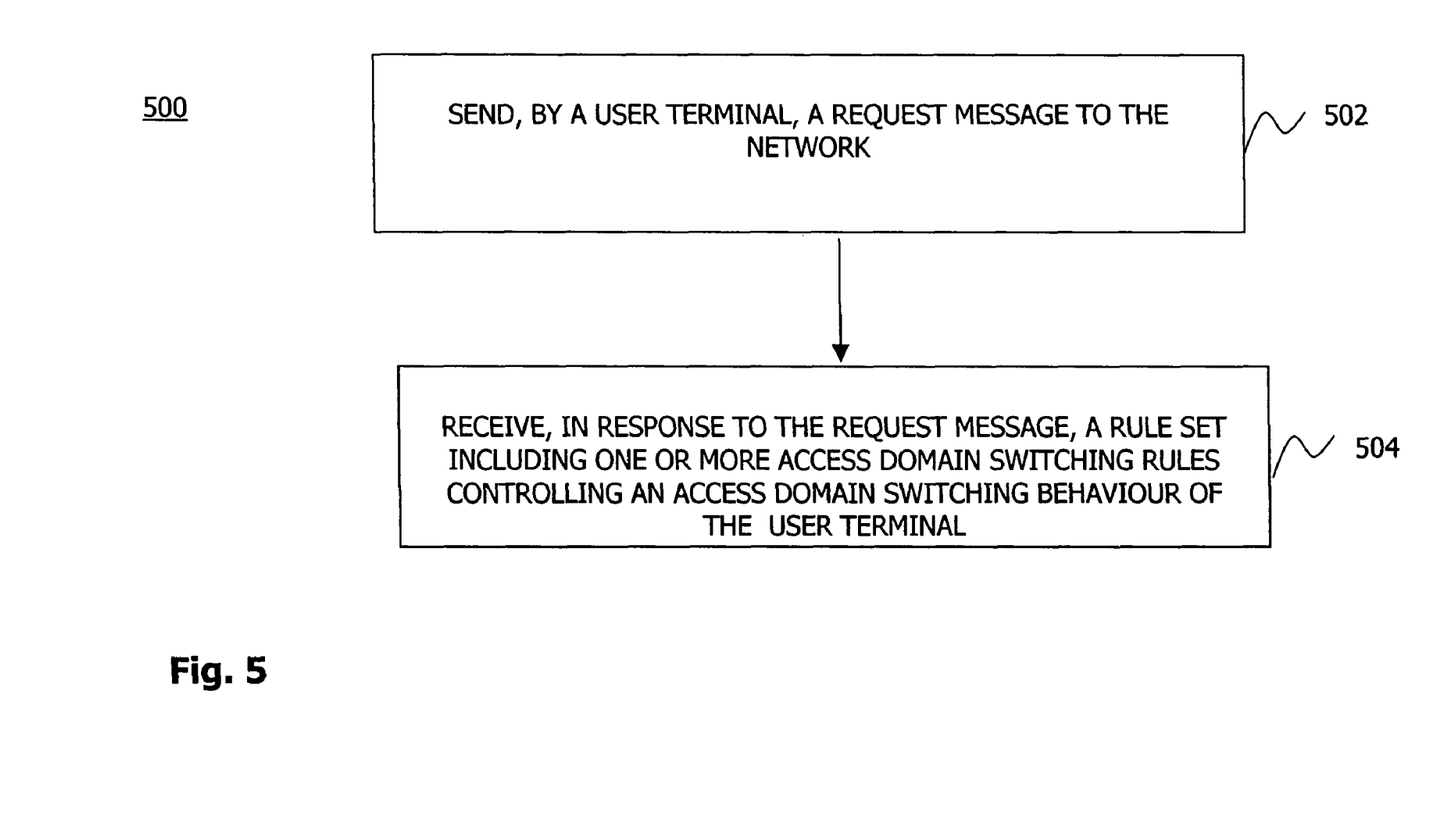
FIG. 5 is a flow chart illustrating a third method embodiment of the present invention.

FIG. 5 shows a flow chart 500 of a third method embodiment of the present invention. The method embodiment of FIG. 5 may be practiced by the user terminal 22 with the components as shown in FIG. 2 or by a user terminal having a different configuration.

In a first step 502, a request message is sent to the network. In a next step 504, a rule set is received in response to the request message. The rule set includes one or more access domain switching rules that control an access domain switching behaviour of the user terminal. The access domain switching rules may specify the requirement of an access domain switching process dependent on parameters including a time of the day, a network condition, a location of the user terminal, an identity of the user terminal as well as receipt of an explicit domain switching instruction from the network node.

Figure 6:
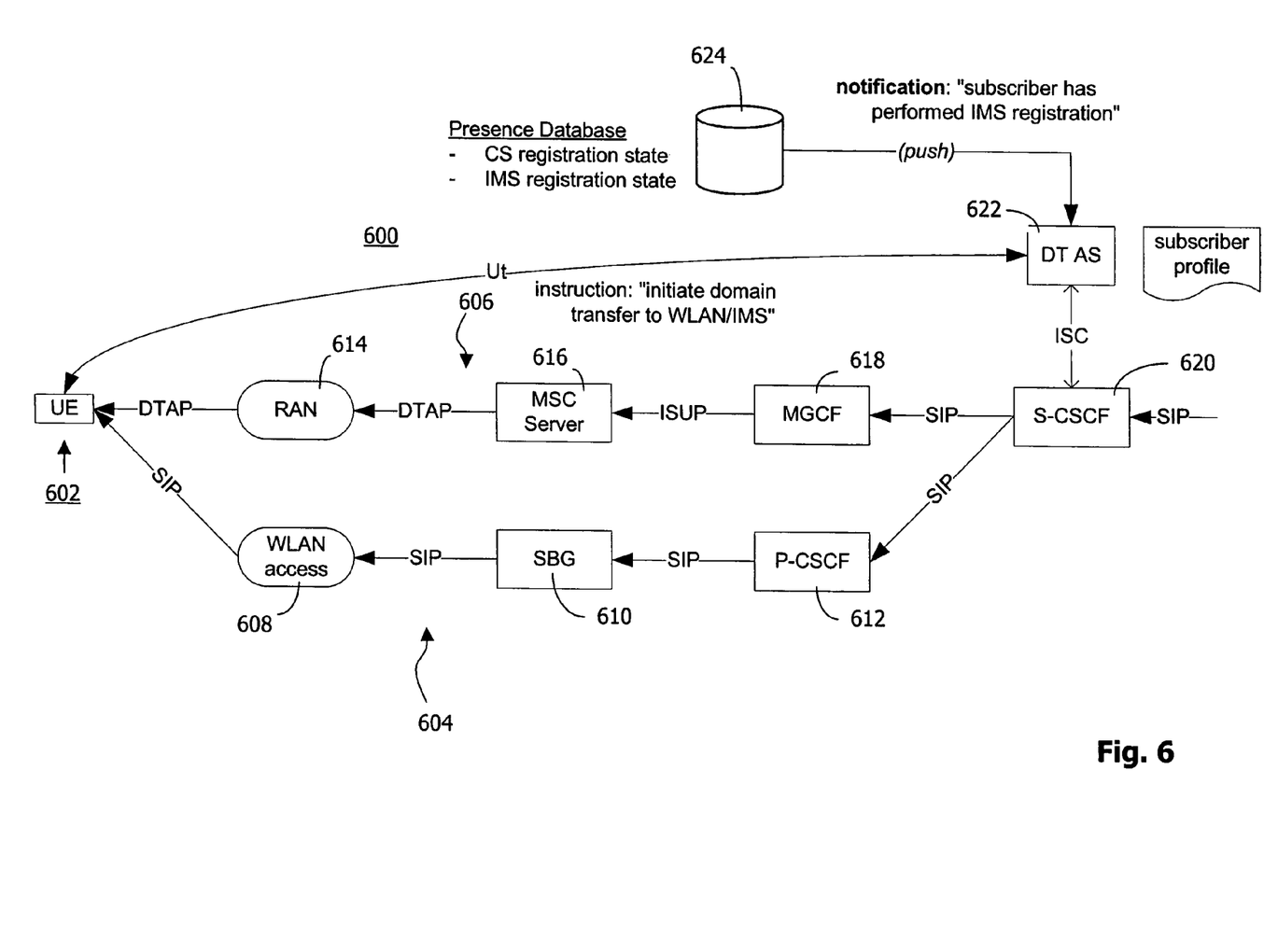
FIG. 6 is a schematic diagram illustrating signalling and components according to a further embodiment of the present invention.

FIG. 6 schematically illustrates the signalling and components involved in an embodiment of an ADS selection procedure. The scenario shown in FIG. 6 can be divided into a network side 600 on the one hand and a terminal side with a user terminal (User Equipment or UE) 602 on the other hand.

The user terminal 602 may have a basic configuration as schematically shown in FIG. 2 and supports two distinct network access technologies. The first network access technology supported by the user terminal 602 is a CS-based cellular access technology according to the GSM standard or any WCDMA standard (e.g., the Universal Mobile Telecommunications System, or UMTS, standard). The second network access technology supported by the user terminal 602 is a PS-based WLAN technology.

The network side 600 may have a basic configuration as schematically shown in FIG. 2. In the exemplary scenario of FIG. 6, the network side 600 comprises a WLAN access leg 604, a cellular access leg 606 and a PS-based IMS core. The IMS core includes on a call control layer a Proxy Call Session Control Function (P-CSCF) 612, a Media Gateway Controller Function (MGCF) 618 and a S-CSCF 620. Additionally, the IMS core comprises a Domain Transfer Application Server (DT AS) 622 on an application layer. The DT AS 622 implements at least some of the ADS functionalities of the present embodiment. As shown in FIG. 6, the DT AS 622 communicates with the S-CSCF 620 (via an ISC interface) and with a presence database 624. The presence database 624 is maintained by a presence server (not shown) and stores registration information about the user terminal 602 such as its CS registration state and its IMS registration state.

The WLAN access leg 604 includes a WLAN access point 608 and a Session Border Gateway (SBG) 610. The SBG 610 is attached to the P-CSCF 612 of the IMS core. Call control on the WLAN access leg 604 involves typical PS call control protocols such as the Session Initiation Protocol (SIP). The cellular access leg 606 includes a Radio Access Network (RAN) 614 and a Mobile Switching Centre (MSC) Server 616. The MSC Server 616 is attached to the MGCF 618 of the IMS core. Call control on the cellular access leg 606 involves a CS call control protocol such as the Direct Transfer Application Part (DTAP) protocol.

In the present embodiment, it is assumed that the features involving the implementation of the access domain switching rules are provided on a subscription basis (although this need not necessarily be the case). Accordingly, the network may provide the corresponding functionalities only if a subscription to a corresponding feature package can be determined. This feature package could be provided in addition or as alternative to a domain transfer event package that has been proposed to exchange mobility related information between a user terminal and a network server.

Figure 7:
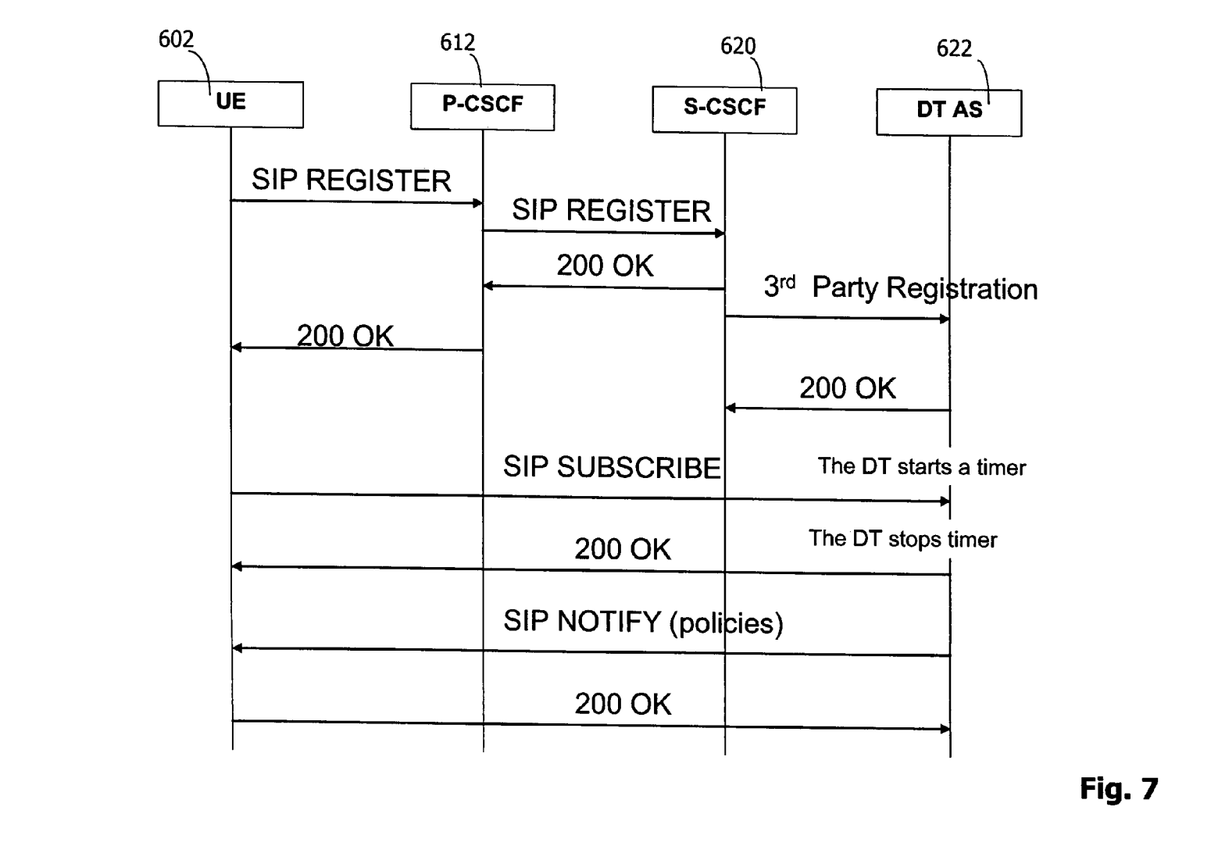
FIG. 7 is a schematic signalling diagram involving some of the components shown in FIG. 6.

In the following, the download of a rule set (of so-called access domain transfer policies) which controls the access domain switching behaviour of user terminal 602 will be described with the reference to the signalling diagram of FIG. 7. As shown in FIG. 7, the download involves the user terminal 602, the P-CSCF 612, the S-CSCF 620 as well as the DT AS 622.

In the embodiment shown in FIG. 7, the download of the rule set is performed during the process of registering the user terminal 602 in the IMS service domain. The combined registration/download procedure starts with a first step in which the user terminal 602 sends a SIP REGISTER message via the WLAN access leg 604 to the P-CSCF 612. The SIP REGISTER message includes in addition to the conventional information access information about the user terminal 602. This access information can be included in the contact field of the SIP REGISTER message or in an additional, designated SIP header. The access information sent by the user terminal 602 includes the access technologies supported by the user terminal 602, such as WLAN, UMTS Terrestrial RAN (UTRAN) and GSM EDGE RAN (GERAN). The SIP REGISTER message may additionally include information about the radio accesses currently available to the user terminal 602 and further information. The further information may relate to the actual access associated with the specific registration (such as location and/or cell information).

As shown in FIG. 7, the P-CSCF 612 forwards the SIP REGISTER message to the S-CSCF 620. The S-CSCF 620 acknowledges receipt of the SIP REGISTER message with a 200 OK message to the P-CSCF 612, which forwards the 200 OK message to the user terminal 602. In addition to acknowledging receipt of the SIP REGISTER message to the P-CSCF 612, the S-CSCF 620 forwards the content of the SIP REGISTER message as received via the P-CSCF 612 from the user terminal 602 to the DT AS 622. The DT AS 622 confirms the registration of the user terminal 602 to the S-CSCF 620 via a 200 OK message and enters the information in a local access table. This access table includes all the access information per user terminal (or, assuming that one user terminal may have two or more registrations at a time, per registration). The information included in the access table may be in accordance with the RFC 3840 "Indicating User Agent Capabilities in the Session Initiation Protocol (SIP)".

For a particular user terminal (or registration), the access table managed by the DT AS 622 may have the following format:

| GERAN | UTRAN | LTE | WLAN | ... |
|---|---|---|---|---|
| Available + location information + roaming/not roaming | Not Available | Not available | Available + location information + roaming/not roaming | |

The exemplary access table includes a first line in which the technically supported access technologies per user terminal are listed, and a second line in which information about the currently available accesses is indicated. In the exemplary table entry shown above, the user terminal would support GERAN, UTRAN, the Long Term Evolution (LTE) standard and WLAN. However, at the moment only coverage for GERAN and WLAN is available. The third and fourth line in the table indicate that location information is available for GERAN and WLAN, and the fifth and sixth lines indicate that the ADS features will be available both for roaming and non-roaming scenarios.

Information about the currently available radio accesses can be updated by the user terminal 602. According to one updating variant, the user terminal 602 sends a SIP RE-REGISTER or SIP INVITE message with the updated information. The user terminal 602 could re-register after each location change of which the IMS should be notified (i.e., not necessarily after each cell change). One possible realisation for providing information about the currently available radio accesses by the user terminal 602 could be the inclusion of a new parameter into SIP messages. This new parameter could have the following format:

P-Available-Access-Info=access-type [Loc info]

This new parameter may allow that multiple access types are listed in sequence or, in the alternative, the P-Available-Access-Info parameter could be included multiple times into the message. At the DT AS 622, the network operator could use initial filter criteria (iFC) to control which subset of mobile terminals, amongst all mobile terminals with multiple access capability, can actually register with the DT AS 622. In the subscription-based scenario considered here, the iFC may be subscribersensitive.

After the DT AS 622 has received the access information for the user terminal 602 from the S-CSCF 620, is starts a timer as shown in FIG. 7. While the timer is running, the DT AS 622 monitors whether the user terminal 602 actually subscribes to the new feature involving the access domain switching rules. Upon receipt of a corresponding SIP SUBSCRIBE message from the user terminal 602, the DT AS 622 stops the timer and sends an acknowledgement in the form a 200 OK message to the user terminal 602. Additionally, the DT AS 622 determines a rule set that is to control the access domain switching behaviour of the user terminal 602 depending on the information about the user terminal 602 in the access table maintained at the DT AS 622, including the currently available radio accesses, the corresponding location information and the roaming state of the user terminal 602. The rule set thus determined is sent in a SIP NOTIFY message from the DT AS 622 to the user terminal 602. The user terminal 602 acknowledges receipt of the SIP NOTIFY message via a 200 OK message. In the case the timer expires without the user terminal 602 subscribing to the new feature, the network can install policies (for example in the DT AS 622) to disallow delivering a call to the user terminal 602 should the user terminal 602 initiate a domain transfer.

If the information about the user terminal 602 in the access table is changing (for example because a new access becomes available or an existing access becomes unavailable), an alternative rule set may automatically be sent to the user terminal 602 which takes such changes into account. A rule set update may also occur, for example, if the user terminal 602 is no longer situated in the home network but roaming in a visited network (or vice versa), or when the terminal type changes (for example due to a swapping of the Subscriber Identity Module, SIM). An update of the rule set can be performed any time via a SIP NOTIFY message sent from DT AS 622 to the UE 602.

In one scenario, the DT AS 622 starts another timer as soon as it successfully receives a 200 OK acknowledgement to an earlier SIP NOTIFY message for a rule set to be installed. The timer specifies a time period that is granted to the user terminal 602 for (a commanded or autonomous) domain transfer. If the timer expires and a domain transfer could not be detected, the DT AS 622 may disconnect the call. Such a feature may be useful in cases in which a network operator wants to purge a certain geographical area by forcing all user terminals in this geographical area to perform a domain transfer.

Of course, the DT AS 622 may use the access table also for local decisions. For example, the DT AS 622 may decide to allow a requested domain transfer only if the user terminal 602 is not roaming abroad, and to disallow the domain transfer in the case the user terminal 602 is roaming abroad.

Once the user terminal 602 has received the rule set from the DT AS 622, it may locally store the rule set for further use. The rule set downloaded to the user terminal 602 gives a network operator accurate control of the access domain that the user terminal will use when setting up a call. Additionally, the rule set implemented by the user terminal 602 allows for a network-controlled access domain transfer also in the case of events that are not visible to the network. Such events include roaming situations in which the user terminal 602 enters a particular WLAN coverage area, or a handover to a particular GSM/WCDMA cell. Since the rule set downloaded to the user terminal 602 may be selected by the DT AS 622 dependent on either one or both of the network access technologies supported by the user terminal 602 and the currently available accesses, access domain selection can be fine-tuned to the requirements of individual user terminals 602. Moreover, a subscription-based implementation allows for a subscriber-individual access domain control.

Examples for individual access domain switching rules include an access domain transfer/access domain selection that is performed by a user terminal dependent on the time of the day. Such a scenario helps network operators to off-load network traffic during certain peak hours of the day for example to WLAN access points. The access domain switching rules may also be implemented based on the location of a user terminal. For example, the access domain switching rules may restrict certain user terminals or subscribers to so-called home zones, disallowing access domain transfer to wide-area cellular access technologies. Another alternative would be that access domain transfer or access domain selection may be restricted in cases in which the user terminal is roaming. According to a further example, the access domain switching rules may indicate that a user terminal should initiate an access domain transfer to WLAN only for certain WLAN access points.

Access domain transfer may be restricted to avoid that too many calls migrate to WLAN in certain areas, or by simply not allowing any access domain transfer when the user terminal is in a visited network. Depending on the granularity of the available location information, the access domain switching rules may allow, disallow or trigger access domain transfer only, for example, in the home network, in some cities, some city areas or even in certain hotspots. Users could be permitted to activate further locations by expanding their contract with the network operator. Moreover, a network operator may expand the geographical scope that can be offered to its subscribers by a service level agreement with WLAN operators.

Still further, the access domain switching rules may restrict access domain switching dependent on the identity of the user terminal. In this regard, access domain switching may be restricted to a particular user terminal, disallowing access domain transfer after SIM swapping to a not-allowed user terminal (which might have in principle domain transfer capabilities).

While the above examples for access domain switching rules could autonomously be implemented by the user terminal, it would also be desirable for the network to ad hoc signal to the user terminal that it shall initiate an access domain transfer. Such an exemplary network-initiated access domain transfer scenario will now be described with reference to FIG. 6.

It will be assumed that the DT AS 622 keeps track of the location of user terminals 602 that are engaged in a call and that have subscribed to the new feature implementing the access domain switching rules. Keeping track of the location may be performed via Mobility Management notifications or via Subscribe-Notify messaging. A further alternative illustrated in FIG. 6 would be the utilization of the presence database 624 as maintained by a presence server (not shown).

In the exemplary scenario of FIG. 6 it is assumed that the user terminal 602 is engaged in a voice call through the CS access leg 606. During the voice call, the user terminal 602 enters coverage of the WLAN access point 608 and automatically performs an IMS registration (as per the existing IMS methodology). In this context, the IMS registration state of the user terminal 602 will be updated in the presence database 624. This updating triggers the transmission of a notification message from the presence server to the DT AS 622. The message pushed by the presence server to the DT AS 622 informs the DT AS 622 that the subscriber of the user terminal 602 has performed an IMS registration.

In response to receipt of the notification message from the presence server, the DT AS 622 checks the locally maintained access domain switching rules to determine whether a network access domain switching is required for the user terminal 602. As already discussed above, the requirement for access domain switching can be determined based on the time of the day, the network condition, the location of the user terminal 602, the identity of the user terminal 602, the network access technologies technically supported by the user terminal 602, and many other parameters.

If it is determined that a network access domain switching is actually required for the user terminal 602, an access domain switching instruction is generated by the DT AS 622 in accordance with the access domain switching rules and sent to the user terminal 602. The corresponding instruction message can be sent from the DT AS 622 via an Ut interface to the user terminal 602. In particular, a SIP NOTIFY message as shown in FIG. 7 could be used for this purpose. The SIP NOTIFY Message may be interpreted by the user terminal as a "domain transfer now!" instruction. If desired, the implementation details of this instruction may be specified in the access domain switching rules previously downloaded to the user terminal 602. The access domain switching rules may for example define the structure of an access domain switching instruction as received from the network and/or the reaction of the user terminal 602 to receipt of an access domain switching instruction.

Via the access domain switching instructions, the network side 600, and in particular the DT AS 622, can dynamically invoke an access domain transfer on demand. This allows the network side 600 to dynamically initiate an access domain transfer as required by network conditions, subscription details, or other parameters.

Although embodiments of the present invention have been illustrated in the accompanying drawings and described in the foregoing description, it will be understood that the invention is not limited to the embodiments disclosed herein. The invention is capable of numerous rearrangements, modifications and substitutions without departing from the spirit of the invention as set forth and defined by the following claims.

The invention claimed is:

1. A method of operating a network node in a network for controlling an access domain switching behavior of a user terminal that can switch from a first network access domain to a second network access domain while a service is being provided to the user terminal, the method comprising the steps of:
   starting a timer with receipt of a request message from the user terminal;
   monitoring if a subscription message is received, from the user terminal, in relation to a network application managing access domain switching rules;
   sending, in response to the request message, a rule set including one or more of the access domain switching rules to the user terminal, the rule set determined by access information from the user terminal;
   sending the rule set only if the subscription message is received before the timer expirers; and
   receiving the access information from the user terminal, the access information relating to at least a first set of network access technologies technically supported by the user terminal.

2. The method of claim 1, wherein the request message aims at registering the user terminal in the network.

3. The method of claim 1, wherein the access information further relates to a second set of network accesses currently available to the user terminal.

4. The method of claim 1, further comprising determining the rule set depending on at least one of a time of the day, a network condition, a location of the user terminal and an identity of the user terminal.

5. A method of operating a network node for controlling an access domain switching behavior of a user terminal that can switch from a first network access domain to a second network access domain while a service is being provided to tile user terminal the method comprising the steps of:
   maintaining a rule set including one or more access domain switching rules for controlling the access domain switching behavior of the user terminal, the rule set being determined depending on access information relating to at least a first set of network access technologies technically supported by the user terminal;
   generating an access domain switching instruction for the user terminal based on the one or more access domain switching rules;
   starting a timer upon receipt of a request message, from the user terminal;
   determining if a subscription message is received, from the user terminal, in relation to a network application managing the access domain switching rules;
   sending, in respond to the request message, the access domain switching instruction to the user terminal; and
   sending the ruse set only, if the subscription message is received before the timer expires.

6. The method of claim 5, wherein the access information further relates to a second set of network accesses currently available to the user terminal.

7. In a network, a method of controlling a user terminal that can switch from a first network access domain to a second network access domain while a service is being provided to the user terminal, the method comprising the steps of:
   sending, by the user terminal, a request message to the network;
   starting a timer upon receipt of the request message;
   monitoring if a subscription message is received, from the user terminal, in relation to a network application managing access domain switching rules;
   receiving, in response to the request message, a rule set including one or more of the access domain switching rules controlling an access domain switching behavior of the user terminal;
   receiving the rule set only if the subscription message is received before the timer expires; and
   sending the access information to the network, the access information relating to at least a first set of network access technologies technically supported by the user terminal.

8. The method of claim 7, wherein the access information further relates to a second set of network accesses currently available to the user terminal.

9. The method of claim 7, further comprising the steps of:
   evaluating at least one access domain switching parameter, defined in the one or more access domain switching rules; and
   autonomously performing an access domain switching decision in accordance with the evaluation of the at least one access domain switching parameter.

10. The method of claim 9, wherein the at least one access domain switching parameter is selected from the group including a time of the day, a network condition, a location of the user terminal and an identity of the user terminal.

11. The method of claim 7, further comprising the steps of:
   receiving an access domain switching instruction from the network, the access domain switching instruction being defined in the one or more access domain switching rules; and
   performing access domain switching in accordance with the received access domain switching instruction.

12. The method of claim 7, wherein the access domain switching is performed to initiate a transfer from the first network access domain to the second network access domain while the service is being provided to the user terminal.

13. The method of claim 7, wherein the access domain switching is performed to select either one of the first network access domain and the second network access domain for originating a service request.

14. The method of claim 7, further comprising the steps of:
sending a subscription message for subscribing to a network application in charge of managing the access domain switching rules; and
receiving the rule set in response to the subscription message.

15. The method of claim 7, wherein the first network access domain is a circuit-switched domain and the second network access domain is a packet-switched domain, or the first network access domain is a domain operated according to a first communication standard and the second network access domain is a domain operated according to a second communication standard.

16. The method of claim 7, wherein the rule set specifies the access domain switching behavior of the user terminal depending on at least one of a time of the day, a network condition, a location of the user terminal, an identity of the user terminal and an access domain switching instruction.

17. The method of claim 7, wherein the one or more access domain switching rules allow, disallow or trigger an access domain transfer from the first network access domain to the second network access domain depending on the current location of the user terminal.

18. A network node for controlling an access domain switching behavior of a user terminal capable of switching from a first network access domain to a second network access domain while a service is being provided to the user terminal, the network node comprising:
a first interface for receiving a request message from the user terminal and starting a timer upon receipt of the request message;
a server for monitoring if a subscription message is received, from the user terminal, in relation to a network application managing access domain switching rules;
a second interface for receiving, in response to the request message, a rule set including one or more of the access domain switching rules for the user terminal; and
a processor for determining the rule set based on at least a first set of network access technologies technically supported by the user terminal, wherein the rule set, determined by access information from the user terminal is received in response to receipt of the request message if the subscription message is received before the timer expires.

19. The network node of claim 18, wherein the processor for determining the rule set based on at least a first set of network access technologies further comprises determining one of a second set of network accesses currently available to the user terminal, a time of the day, a network condition, a location of the user terminal and an identity of the user terminal.

20. A network node for controlling an access domain switching behavior of a user terminal that can switch from a first network access domain to a second network access domain while a service is being provided to the user terminal, the network node comprising:
a database with a rule set including one or more access domain switching rules for controlling the access domain switching behavior of the user terminal;
a timer being started upon receipt of a request message from the user terminal;
a generator for generating an access domain switching instruction for the user terminal based on the one or more access domain switching rules;
a server for monitoring if a subscription message is received, from the user terminal, in relation to a network application managing the access domain switching rules;
a first interface for sending the access domain switching instruction to the user terminal, wherein the rule set is determined depending on access information relating to at least a first set of network access technologies technically supported by the user terminal; and
a second interface for receiving the rule set in response to receipt of the request message only if the subscription message is received before the timer expires.

21. The network node of claim 20, wherein the access information further relates to a second set of network accesses, currently available to the user terminal.

22. A user terminal in a network for switching from a first network access domain to a second network access domain while a service is being provided to the user terminal, the user terminal comprising:
a first interface for sending a request message, wherein a timer is started in the network upon receipt of the request message;
the first interface for sending a subscription message to the network in relation to a network application managing access domain switching rules; and
a second interface for receiving, in response to the request message, a rule set, determined by access information received from the user terminal, including one or more of the access domain switching rules controlling an access domain switching decision of the user terminal, the rule set sent to the user terminal only if the subscription message is received before the timer expires, the access information relating to at least a first set of network access technologies technically supported by the user terminal.

23. The user terminal of claim 22, wherein the access information further relates to a second set of network accesses currently available to the user terminal.

* * * * *

UNITED STATES PATENT AND TRADEMARK OFFICE
CERTIFICATE OF CORRECTION

PATENT NO. : 8,411,641 B2  
APPLICATION NO. : 12/518037  
DATED : April 2, 2013  
INVENTOR(S) : Keller et al.

Page 1 of 1

It is certified that error appears in the above-identified patent and that said Letters Patent is hereby corrected as shown below:

In the Specifications:

In Column 1, Line 16, delete "via is" and insert -- via --, therefor.

In Column 1, Line 60, delete "WCDMAbased" and insert -- WCDMA-based --, therefor.

In Column 2, Line 23, delete "CSGSM/WCDMA." and insert -- CS-GSM/WCDMA --, therefor.

In Column 7, Line 52, delete "42. In the database 42," and insert -- 32. In the database 32, --, therefor.

In Column 10, Line 59, delete "subscribersensitive." and insert -- subscriber-sensitive. --, therefor.

In the Claims:

In Column 13, Line 66, in Claim 5, delete "tile" and insert -- the --, therefor.

In Column 14, Line 16, in Claim 5, delete "respond" and insert -- response --, therefor.

In Column 14, Line 18, in Claim 5, delete "ruse" and insert -- rule --, therefor.

Signed and Sealed this  
Ninth Day of July, 2013

Teresa Stanek Rea  
*Acting Director of the United States Patent and Trademark Office*